United States Patent Office 3,516,278
Patented June 23, 1970

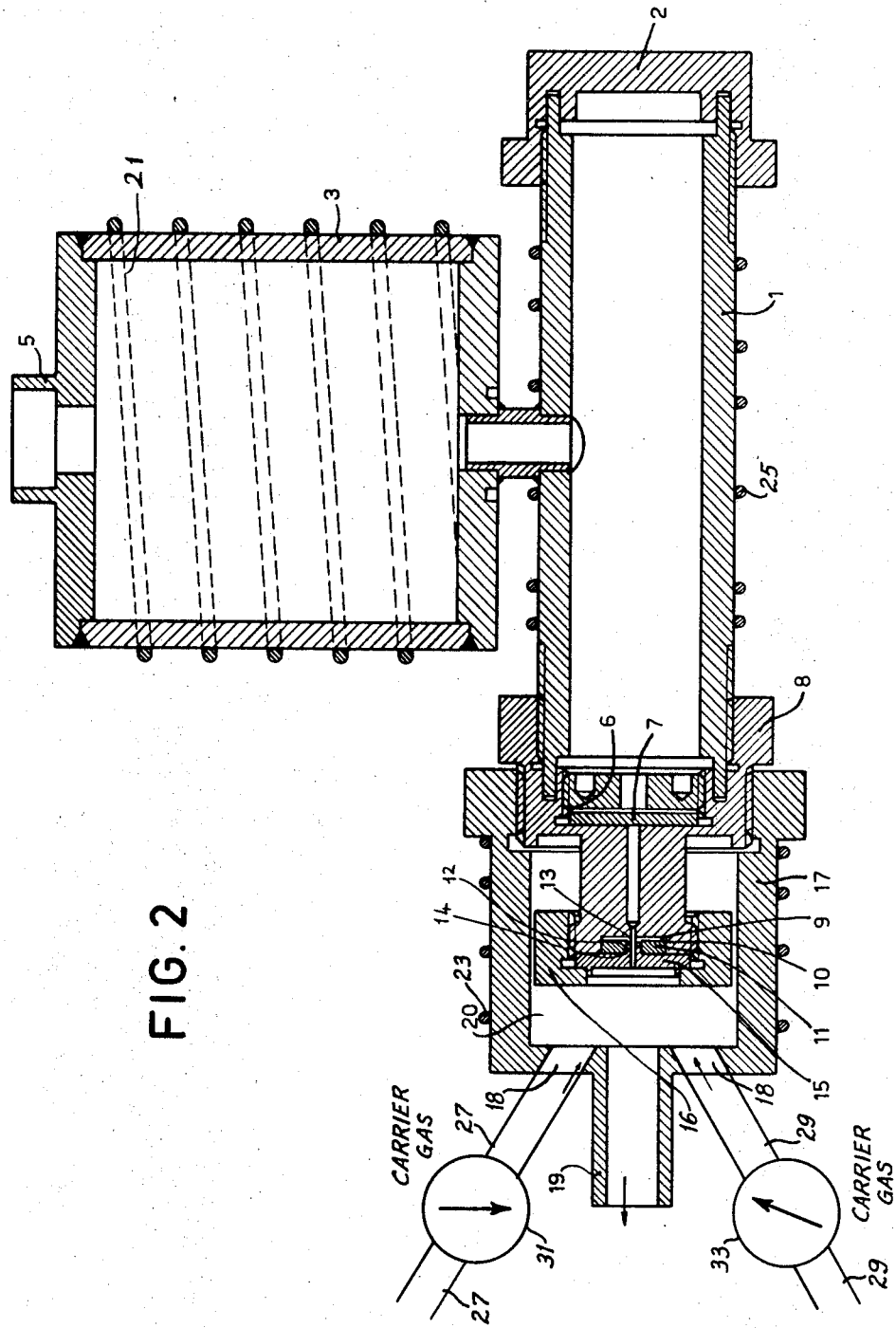

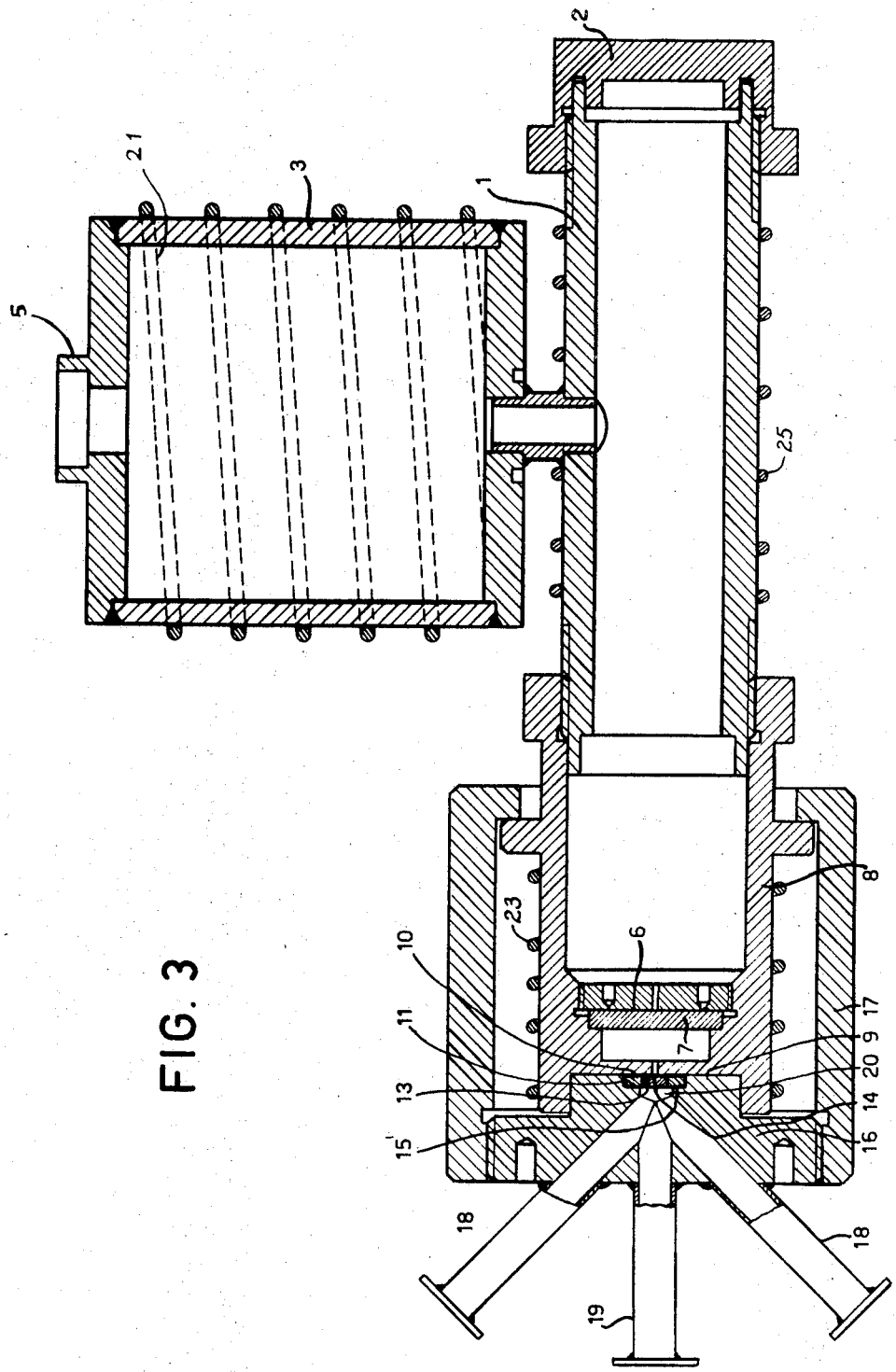

3,516,278
APPARATUS FOR PRODUCING CALIBRATED LEAKS
Klaus Klein, Taino, and Luc Verheyden, Ispra, Italy, assignors to The European Atomic Energy Community (Euratom), Brussels, Belgium
Filed Apr. 11, 1968, Ser. No. 720,532
Claims priority, application Italy, Apr. 17, 1967, 36,173/67
Int. Cl. G01d 21/00
U.S. Cl. 73—1    3 Claims

ABSTRACT OF THE DISCLOSURE

Apparatus for providing a standard for use in the calibration of a quantitative leak detector comprises a pressurized tank containing the substance to be detected, a tank outlet having a filter connected thereto, a receptacle for the filtered substance, a receptacle outlet having a calibrated orifice, a collecting chamber connected to the outlet of the orifice and means connecting the chamber outlet to a leak detector.

---

The invention relates to apparatus for use to provide a standard for calibration of quantitative detectors for leakages of particular fluids or a standard to form the basis of comparison in such detectors. The invention is based on the principle of establishing a standard leakage rate of a fluid (or mixture of fluids) by passing the fluid (or mixture) under set conditions through a calibrated orifice, the fluid or mixture, if liquid, being vaporised after passage through the orifice and mixed with a metered carrier gas.

The invention is particularly (but not exclusively) intended for use with substances which have a melting point above normal ambient temperatures (i.e. above about 20° C.) and with mixtures of substances of different melting points and vapour pressures.

The invention provides apparatus for the above purpose which comprises a tank for a sample of the substance or mixture and arranged to be pressurised, an outlet from the tank with a filter for the substance or mixture leaving the tank, a receptacle for the filtered substance or mixture, a calibrated orifice in an outlet from the receptacle, a collecting chamber for substance or mixture passing through the orifice and an outlet from the chamber for connection to a leak detector.

When the apparatus is for use with a liquid substance or mixture it may have means for feeding a carrier gas into the chamber to vaporise or assist in vaporising the liquid leaving the orifice.

When the apparatus is for use with substances which have melting points above ambient temperature it may have means for heating the orifice, the chamber and the tank.

In use the tank containing the substance to be tested is subjected to regulatable temperature and pressure; the substance (unless it be a gas as later mentioned) is passed in the liquid state through the filter and thence through the orifice. The amount of the substance which passes can be regulated by varying the temperature, the pressure or the diameter of the orifice. The substance emerging from the orifice is vaporised by keeping the temperature of the orifice high enough and passing a jet of carrier gas near the orifice outlet.

A non-limitative exemplary embodiment of the apparatus according to the invention is illustrated in the accompanying drawings, wherein:

FIG. 2 shows the assembled apparatus, and

FIG. 3 shows the same apparatus adapted for use with a gaseous fluid at ambient temperature.

Figure 1:
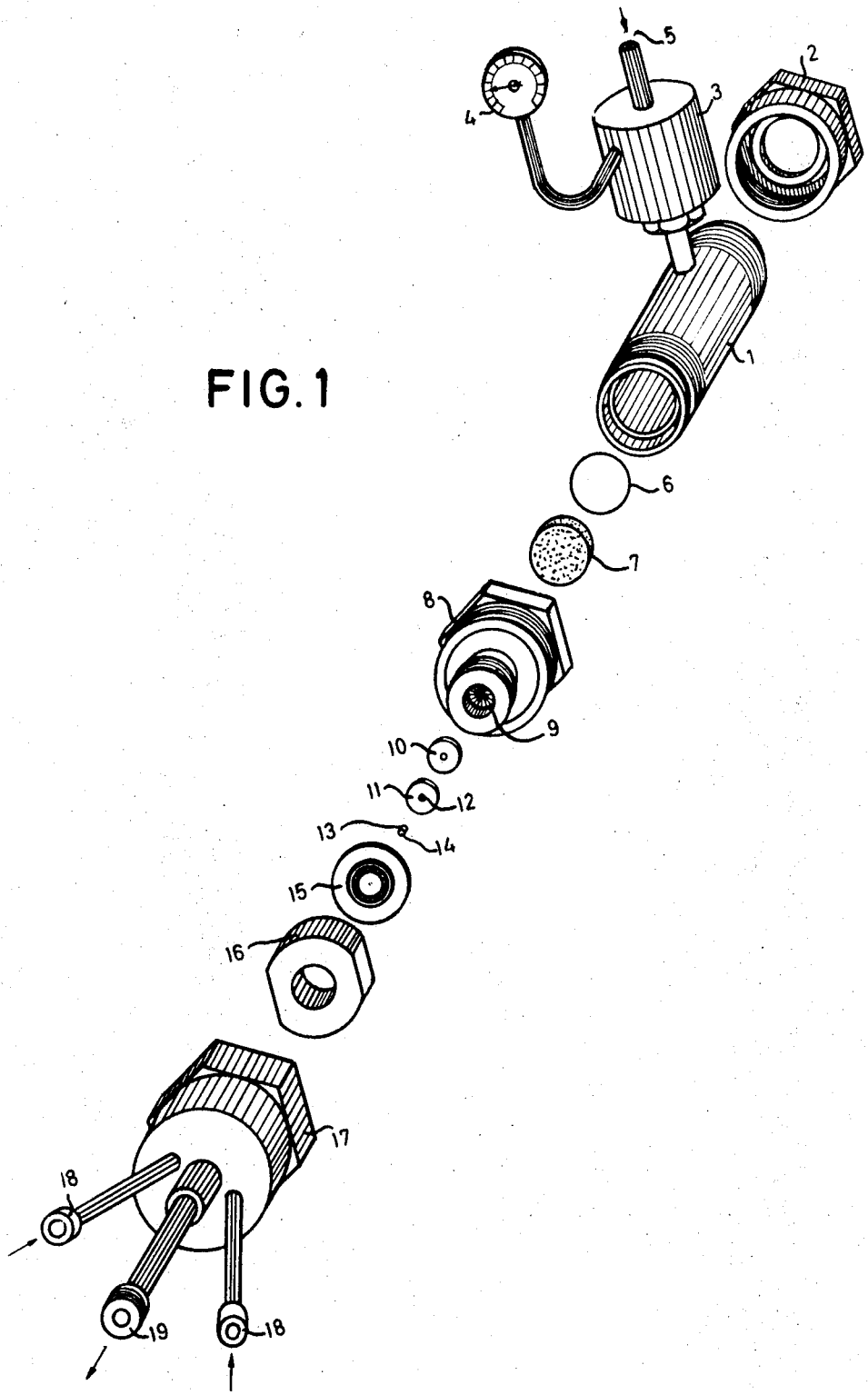
FIG. 1 is an exploded view of the apparatus, showing all its components.

Referring to FIGS. 1 and 2, a cylindrical tank or receptacle 1, having a capacity of about 150 cm.$^3$, is closed at one end by a screwthreaded cover 2. Disposed above the receptacle 1 is a reserve tank 3 having a manometer or pressure gauge 4, a thermocouple (not shown), and a feed aperture 5 for a pressure gas which ensures that liquid flows through the aforementioned orifice. A ceramics filter 7 is made completely sealing-tight by a silver joint 6. The filter 7 prevents the passage of impurities which might block the outlet orifice 14 later described.

The porosity of the filter is such that the diameter of its pores is of the order of magnitude of the diameter of the outlet orifice 14. The joint 6 and filter 7 are held in a screwthreaded head 8 screwed to the receptacle 1. The head 8 also has a cylindrical cavity 9 receiving a second silver joint 10 which is formed with a central aperture and against which a centering member 11 bears. This member 11 is formed with an aperture 12 in which a small cylinder or plate or lozenge 13 formed with the outlet orifice 14 is disposed. The members 10, 11 and 13 and also the front central portion of a member 15, also formed with a central aperture, are clamped in the cavity 9 of the screwthreaded head 8 by means of a screwthreaded member 16. Although not clearly shown in the drawings the diameters of the apertures in the joint 10 and the intermediate member 15 are equal to half the diameter of the lozenge 13, so that the assembly is given further sealing-tightness. The lozenge 13, formed with the calibrated orifice 14 for the outlet of the material under examination, is made of molybdenum or some other material having a satisfactory mechanical strength at elevated temperature, the orifice being produced by means of bombardment with an electron gun, so as to obtain orifices having diameters of from 100 to 5 microns with satisfactory dimensional tolerances. Disposed at the end of the apparatus is a terminal member 17 having inlets 18 for the carrier gas and an outlet 19 to the detector, and containing a chamber 20 for the evaporation and mixing of the organic liquid. A meter, not shown, is provided for the carrier gas.

The members 1, 2, 8, 16 and 17 are made of rust-resistant steel. The inlets 18 and the outlet 19, the chamber for the evaporation of the organic liquid, the head 8 receiving the lozenge 13, and the reserve tank 3. As shown in FIGS. 2 and 3, orifice 14 is heated by heating wires 23 and tank 1 is heated by heating wires 25. Reserve tank 3 is heated by heating wires 21. Preferably, the outlet orifice 14 is provided in the lozenge rather than in the walls of a receptacle, for reasons of interchangeability and practicality. If the orifice becomes blocked, the lozenge can be more readily and economically interchanged than any other member of larger dimensions; moreover, if the amount of the flux emerging is to be varied, it is enough merely to substitute for the lozenge a fresh lozenge having an orifice of different diameter, instead of having to substitute a complete tank with calibrated leakage.

The assembly of the apparatus according to the invention is checked by internal nitrogen pressurisation, either cold or hot (working temperature). This check tends to ensure that there are no leakages amongst the various members and that the liquid under test can emerge only from the calibrated orifice 14, at the various required temperatures. To calibrate the orifice, flow therethrough is measured by the condensation of the vapour in the member 17. The condensate is then weighed by known methods and chromatographically analysed. The rate of flow is regulated either by changing the diameter of the calibrated orifice 14 in the lozenge 13, or by varying the temperature of the receptacle 1 and the cylindrical cavity 9.

To prevent the diameter of the calibrated orifice 14 from changing during operation, a gas flow must be maintained all the time the material in receptacle 1 is liquid and emerges from the orifice 14 under pressure. The carrier gas must not cause oxidation and must not be a catalyst for the pyrolysis of the material used, or any other reactions. As shown in FIG. 2, conduits 27 and 29 conduct the carrier gas to inlets 18. The flow of carrier gas is monitored by flow meters 31 and 33.

If the receptacle 1 contains a gas instead of a liquid, the carrier gas is not used, and the apparatus illustrated in FIGS. 1 and 2 is adapted as shown in FIG. 3, in which like members have like references. A silver joint 15′ is substituted for the intermediate member 15 in FIGS. 1 and 2.

It is an advantage of the invention when using liquid mixtures that the composition of the vapours produced is the same as that of the liquid mixture. This follows from the fact that the whole of the small amounts of liquid leaving the calibrated orifice is vaporised and is in contrast with arrangements in which carrier gas is passed over or through a large body of the liquid mixture in which case selective vaporisation tends to occur.

Clearly, the invention is not limited to the embodiment and arrangement of its parts described hereinbefore and illustrated in the accompanying drawings, but modifications can be made thereto without exceeding the scope of the invention.

We claim:
1. Apparatus producing a standard leak for calibrating leak detectors, comprising a pressurised tank for the leak substance, a receptacle, a filtered outlet from said tank to said receptacle, a collecting chamber, a calibrated orifice between the receptacle and the collecting chamber, carrier gas inlets fed from a carrier gas reservoir into said collecting chamber, and means for heating the tank, the orifice and the chamber.

2. Apparatus as claimed in claim 1 in which the orifice is provided in an interchangeable lozenge or plate.

3. Apparatus as claimed in claim 2 in which the orifice has been produced by electronic bombardment.

References Cited

UNITED STATES PATENTS 2,981,091   4/1961   Roberts.
3,188,854   6/1965   Hersch _____ 73—23
3,209,579   10/1965   Roberts.

OTHER REFERENCES

Hill et al.: Journal Scientific Instruments, vol. 42, No. 11, November 1965, pp. 783–786.

S. CLEMENT SWISHER, Primary Examiner